United States Patent

[11] 3,568,099

[72] Inventor Gene Chao
Menlo Park, Calif.

[21] Appl. No. 817,646
[22] Filed Apr. 21, 1969
[45] Patented Mar. 2, 1971
[73] Assignee Textron, Inc.
Belmont, Calif.

[54] MATCHED MICROWAVE LIMITER
6 Claims, 4 Drawing Figs.

[52] U.S. Cl. .......... 333/17, 333/33, 333/81, 307/237
[51] Int. Cl. .......... H04b 3/04, H03h 7/38, H01n 1/22
[50] Field of Search .......... 333/17, 31, 33, 81; 307/237; 328/169, 171

[56] References Cited

UNITED STATES PATENTS

| | | | |
|---|---|---|---|
| 3,226,661 | 12/1965 | Garver et al. | 333/17X |
| 3,325,754 | 6/1967 | Frisch et al. | 333/81 |
| 3,435,253 | 3/1969 | Robinson | 328/171X |
| 3,454,906 | 7/1969 | Hyltin et al. | 333/31 |
| 3,465,171 | 9/1969 | Moses | 328/171X |

*Primary Examiner*—Herman Karl Saalbach
*Assistant Examiner*—T. Vezeau
*Attorney*—Gregg and Hendricson

ABSTRACT: An improved limiter for microwave circuits to remove voltage applied to a load when the voltage amplitude exceeds a predetermined value without reflections in the circuit. A pair of voltage sensitive switches are connected across a circuit with one switch in series with an insert impedance substantially equal to line impedance. The switches are separated by an impedance inverter to effectively apply a very large impedance across the insert impedance to prevent R-F reflection in the limiting mode.

INVENTOR.
GENE CHAO
BY
Gregg & Henderson
ATTORNEYS

MATCHED MICROWAVE LIMITER

The present invention is particularly directed to microwave circuits and to the protection of load or circuit elements therein. It is common in microwave systems to employ limiters for protection or dynamic range compression. It is realized that various circuits and circuit components employed in microwave systems are easily damaged by overvoltage, and thus some type of protective device or circuitry is normally employed to limit applied voltage to a safe level. Such limiting is commonly accomplished by voltage-sensitive diodes connected across a microwave circuit ahead of components, which may be denominated as a "load" in this connection, for limiting voltage applied to the load. While this procedure does provide for voltage limiting, it also produces voltage reflections which are highly undesirable in most microwave circuits. The electrical short formed by one or more conducting diodes with the application of greater than limiting voltage thereto produces a discontinuity which reflects R-F energy. The present invention is directed to machine the limiter, so that energy is not reflected in the limiting mode of operation of the limiter.

There is illustrated in the drawing a conventional prior art microwave limiter, as well as schematic illustrations of preferred embodiments of the present invention and one possible physical construction of the invention. In the drawings.

Figure 1:
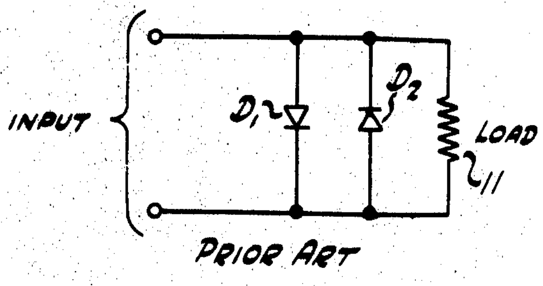
FIG. 1 is a schematic illustration of a matched microwave limiter.

Considering first the illustration of FIG. 1 of the drawing, there will be seen to be shown a load 11 connected across conductors of a microwave circuit. The load may, of course, comprise a wide variety of different circuit components, for example, and is only denominated as a "load" because of its relation to the limiter of the circuit. Limitation upon voltage applied across the load 11 is provided by one or more voltage-sensitive diodes or varactors, denominated as $D_1$ and $D_2$ in FIG. 1. Some microwave limiters employ but a single voltage-sensitive diode across the load, while others employ two, as shown in FIG. 1. In this circuitry the application of a voltage above diode cutoff voltage will cause the diode or diodes to conduct and form a substantially short circuit ahead of the load to prevent application of the overvoltage thereto. One improvement in diode limiters is to be found in U.S. Pat. No. 3,226,661 to Garver et al. wherein the distance between diodes $D_1$ and $D_2$, as in FIG. 1, is determined in accordance with certain graphical methods set forth therein for achieving broad band limiting. While the system of this patent is undoubtedly advantageous, it will be appreciated from a study thereof that energy will be reflected back toward the input when the diodes thereof conduct, as a mismatch occurs by shorting of the transmission line.

Figure 2:
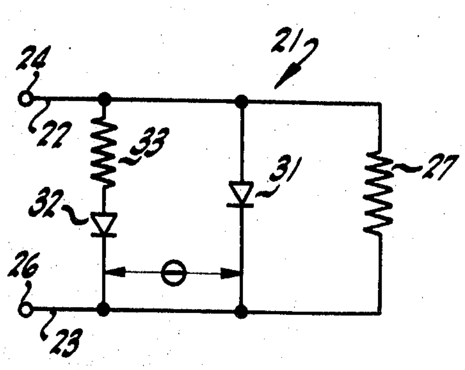
FIG. 2 is a schematic illustration of a matched microwave limiter circuit in accordance with the present invention.

The present invention is particularly directed to achievement of simplified limiting in microwave circuits, and also to machine of the limiter so as to preclude reflection of energy in the limiting mode thereof. Referring to FIG. 2 of the drawing, there will be seen to be illustrated a transmission line 21 which may be embodied as a coaxial cable, a strip line, a microstrip, or the like, but which for simplicity is merely illustrated as a pair of parallel conductors 22 and 23 extending from input terminals 24 and 26 to some type of load 27 connected between such conductors. As previously noted, this load may comprise any of a large variety of circuit components employed in a microwave system. It will be appreciated that in accordance with conventional practice, the impedance $Z_L$ of the load 27 is made substantially equal to the input impedance $Z_{IN}$ of the transmission line, so that in normal operation energy is not reflected by the load termination of the line. Matched microwave limiting is provided in the present invention by the connection of a first diode 31 between the transmission line conductors 22 and 23 across the load 27. The invention further provides for the connection of a second diode 32 in series with an impedance 33 between the conductors of a transmission line in parallel with the first diode 31. Furthermore, the two diode connections are displaced along the transmission line a distance which is equal to one quarter wavelength of transmission line operation. It is also to be appreciated that this separation may be a multiple of a quarter wavelength.

In operation of the illustrated embodiment of the present invention, the application of a voltage to the transmission line as across the terminals 24, 26 which is below cutoff voltage, results in a nonlimiting mode of the invention, inasmuch as the diodes remain as open circuits, and the line impedance is matched by the load impedance. As the voltage between conductors of the line increases beyond cutoff, a sufficient voltage is then applied across the diodes to cause same to conduct. This then causes the diode 31 to approach a short circuit across the line, i.e., a very small impedance, as of the order of a few ohms. It is, however, particularly noted that the diode 31 is separated from the now connected impedance 33 by a quarter wave transmission line. A quarter wave transmission line acts as an impedance inverter and, consequently, the very low impedance of diode 31 appears as a very large impedance across the impedance 33 now connected across the line by the conducting diode 32. Consequently, the transmission line sees the impedance 33 across the same as a termination. The value of the impedance 33 is made substantially equal to the load impedance, and the transmission line is then terminated by the impedance 33, and the very large impedance of diode 31 as inverted directly thereacross, so as to match the input impedance.

In practice it has been found that a very good impedance match is obtained with the present invention over an octave bandwidth with the simple embodiment of the present invention illustrated. An even greater bandwidth matching may be accomplished by the provision of improved impedance inverters such as multiquarter wave sections, i.e., cascaded sections. It is, however, noted that the present invention does provide a very simple microwave limiter requiring substantially no more physical space than conventional limiters, but which does match impedance upon operation in the limiting mode. This precludes the prior art necessity of employing isolating devices oftentimes required to achieve requisite impedance matching at all power levels.

In the limiting mode of the present invention, the very low impedance of the conducting voltage-sensitive diode 31 is inverted by the quarter wave transmission line, so as to appear as a very large impedance across the inserted impedance 33 so that the parallel combination matches the input impedance. It is believed clear that the invention, particularly in the illustrated embodiment, is quite simple, and yet the results achieved are indeed remarkable.

Figure 3:
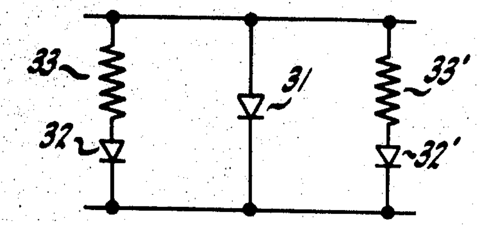
FIG. 3 is a schematic illustration of a bilateral matched limiter.

It is to be appreciated that although the invention has been described and illustrated with respect to limiting in a single direction it is also possible to provide bilateral matched limiting in accordance with the present invention. Various different circuits require limiting in both directions and a limiter capable of accomplishing this without reflections is illustrated in FIG. 3. The circuit of FIG. 2 will be seen to be identical to that of FIG. 2 insofar as the voltage-limiting diode 31 and the diode and impedance combination 32, 33. These elements are connected across conductors 22, 23 of the circuit in the same manner as described above and separated by a quarter wavelength at the frequency of circuit operation. There is additionally provided a series combination of diode 32' and impedance 33' connected across the circuit on the opposite side of the diode 31 from the first diode-impedance combination. The diode and impedance 32' 33' are separated along the circuit a quarter wavelength from the diode 31. Consequently it will be seen that bilateral limiting is provided with the circuit of FIG. 3 in the same manner as unilateral limiting in the circuit of FIG. 2. A "load" disposed at either end of the limiter circuit of FIG. 3 will be protected in the same manner as the load of FIG. 2 and without the production of any reflections in this circuit in the limiting mode.

Figure 4:
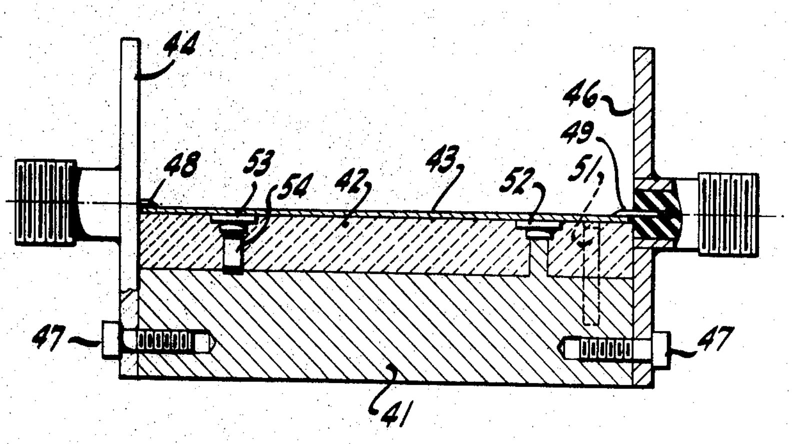
FIG. 4 is a central longitudinal sectional view of a physical embodiment of the invention.

It is to be appreciated further that the present invention may be physically embodied in a variety of ways, however, there is illustrated in FIG. 4 a simple test setup embodying the invention. Referring to FIG. 4 it will be seen to be provided a metal ground plane 41 having a ceramic plate 42 disposed atop same with a thin electrically conducting tape 43 disposed atop the ceramic plate. This general type of construction may be termed a microstrip. Electrical connectors 44 and 46 are disposed one at each end of the unit with bolts 47 threaded into the ground plane and mounting the connectors thereto. The central conductors 48 and 49 of the connectors 44 and 46, respectively, are joined to the microstrip at the ends thereof as shown. Aligning pins 51 may be provided to properly dispose the ceramic plate on the ground plane.

The limiter of the present invention includes a diode 52 physically disposed in an opening in the ceramic plate with the top of the diode engaging the conducting strip 43 and the bottom being electrically connected to the ground plane 41 as by an upward protrusion of the plane through an opening in the ceramic plate. One quarter wavelength along the ceramic plate from the diode 52 there is disposed the second diode 53 fitting into a depression in the ceramic plate and engaging the underside of the electrically conducting strip 43. The insert impedance in the form of a small resistor 54 extends from the bottom of the diode 53 through a small aperture in the surrounding plate into a depression in the top of the ground plane 41. It will be seen that this structure provides the same circuitry as illustrated in FIG. 2 and it is noted that either PIN diodes or varactors may be used in the limiter. In the case of PIN diodes a small DC return line comprising an open circuit at the RF frequency is also provided.

No attempt is made in the illustration of FIG. 4 to optimize the device for manufacture. However, the particular embodiment illustrated therein has been operated with highly satisfactory results which fully establish the limiting operation of the present invention and the absence of reflection in the limiting mode. It is further noted that the illustration of FIG. 4 is substantially enlarged, for the actual device illustrated therein has a length of 1 inch and a height only slightly greater than ⅛ of an inch aside from the end connectors.

Although the present invention has been described with respect to particular preferred embodiments thereof it is not intended to limit the invention to the details of description and illustration. Reference is made to the appended claims for a precise definition of the invention.

I claim:

1. A matched microwave limiter for a load connected across a transmission line and having substantially the same impedance as the input impedance of the line comprising a first voltage-sensitive switch connected across said line immediately ahead of said load for conduction at a predetermined maximum line voltage, and a second voltage-sensitive switch connected in series with an insert impedance across said line one-quarter wavelength ahead of said first switch, said insert impedance substantially equaling said load impedance whereby conduction of said switches inverts the low impedance of said conducting first switch into a high impedance across said insert impedance so that same substantially matches the line input impedance for preventing energy reflection during limiting.

2. The matched microwave limiter of claim 1 further defined by said first and second voltage-sensitive switches being cutoff diodes conducting only upon application of voltage in excess of a predetermined minimum and reverting to nonconduction upon reduction of applied voltage below such minimum.

3. The limiter of claim 2 further defined by said diodes having a very low impedance in conducting state and a very high impedance in nonconducting state.

4. The limiter of claim 1 further defined by a second series combination of a voltage sensitive switch and another insert impedance connected across the circuit on the opposite side of said first switch from said first combination and spaced from said first switch one-quarter wavelength at circuit operating frequency for bilateral limiting without reflection.

5. The limiter of claim 1 further defined by the separation of first switch and second switch and impedance along the circuit being an odd multiple of one-quarter wavelength at operating frequency of the circuit.

6. The limiter of claim 1 further defined by the separation of first switch and second switch impedance combination being by multiquarter wavelength sections for broadband limiting without reflections.